United States Patent [19]

Doi

[11] Patent Number: 4,919,402
[45] Date of Patent: Apr. 24, 1990

[54] VIBRATION DAMPING DEVICE UTILIZING ELECTRORHEOPECTIC FLUID

[75] Inventor: Kazuhiro Doi, Yokohama, Japan

[73] Assignee: Nissan Motor Co., Ltd., Japan

[21] Appl. No.: 365,260

[22] Filed: Jun. 12, 1989

[30] Foreign Application Priority Data

Jun. 13, 1988 [JP] Japan .................. 63-145092

[51] Int. Cl.⁵ .................. F16F 15/04; B60K 5/12
[52] U.S. Cl. .................. 267/140.1; 248/562; 267/219
[58] Field of Search .................. 267/140.1 A, 140.1 E, 267/140.1 AE, 140.1 R, 219, 35; 248/562, 636, 638

[56] References Cited

U.S. PATENT DOCUMENTS

| | | |
|---|---|---|
| 4,546,960 | 10/1985 | Abrams et al. .................. 267/140.1 |
| 4,618,128 | 10/1986 | Härtel et al. .................. 267/140.1 |
| 4,733,758 | 3/1988 | Duclos et al. .................. 248/562 X |
| 4,757,981 | 7/1988 | Itärtel .................. 267/219 |

*Primary Examiner*—Andres Kashnikow
*Assistant Examiner*—Matthew C. Graham
*Attorney, Agent, or Firm*—Leydig, Voit & Mayer

[57] ABSTRACT

The acceleration which is induced by the vibration applied to the device is sensed along with the pressure which develops in an auxiliary or expansion chamber associated with the main working chamber. When the product of the pressure and the acceleration exhibits a predetermined characteristic, a voltage is applied to the electrodes in the orifice passage to increase the viscosity of the ERF.

4 Claims, 4 Drawing Sheets

VIBRATION DAMPING DEVICE UTILIZING ELECTRORHEOPECTIC FLUID

BACKGROUND OF THE INVENTION

1. Field of the Invention

The present invention relates generally to mounting devices of the nature used to support vibrating bodies, and more specifically to a mounting device which utilizes an electrorheopectic fluid (ERF).

2. Description of the Prior Art

JP-A-No. 60-104828 describes an example of damping type unit which takes the form of a hollow elastomeric bush member filled with an electrorheological or electrorheopectic fluid (viz., an ERF as it will simply be referred to hereinafter) and which is further provided with an electrically controlled orifice unit which divides the device into a working chamber and an expansion chamber. With this device, when the bush is compressed, fluid is displaced from the working chamber into the auxiliary one (defined between the orifice unit and a relative flexible diaphragm) and vice versa. By applying a high voltage across the electrodes of the orifice, the viscosity of the ERF can be induced to undergo a remarkable increase and the fluid in the orifice passage induced to assume to an almost solid state. Under these conditions the orifice is either effectively blocked or the restrictive properties thereof remarkably increased.

However, this general type of damping arrangement, including, for example the type of arrangement which is disclosed in U.S. Pat. No. 4,742,998, are such that when expressed in the form of a model, they assume the configuration shown in FIG. 6. As will be appreciated from this model this type of system is such as to exhibit only one degree of freedom. Further, these systems have considered only the displacement of the vibrating body (viz., the structure to which vibration is applied) and that of the supporting body (viz., the body which receives the vibration which is transmitted thereto from the vibrating one) for controlling the impression of control voltage across the electrodes which are designed to control the viscosity of the ERF, optimal operation of the device has not been achieved.

SUMMARY OF THE INVENTION

It is an object of the present invention to provide a vibration damping device which enables the control of the voltage impression on the viscosity control electrodes in a manner which improves the vibration damping characteristics thereof.

The above object is achieved by an arrangement wherein the acceleration which is induced by the vibration applied to the device is sensed along with the pressure which develops in an auxiliary or expansion chamber associated with the main working chamber. When the product of the pressure and the acceleration exhibits a predetermined characteristic, a voltage is applied to the electrodes in the orifice passage to increase the viscosity of the ERF.

A first aspect of the present invention is deemed to comprise a method of operating a vibration damping device having a housing in which main and auxiliary chambers are defined, and an orifice passage which interconnects the main and auxiliary chambers and in which electrodes are disposed, the method featuring the steps of: sensing the acceleration caused by a vibration which is applied to the damping device; sensing a pressure which is indicative of the pressure prevailing in the auxiliary chamber; and controlling the impression of a voltage on the electrodes in accordance with the product of the acceleration and the pressure.

A second aspect of the present invention is deemed to comprise a vibration damping device which features: a housing in which main and auxiliary chambers are defined; an orifice passage which interconnects the main and auxiliary chambers and in which electrodes are disposed; means for sensing the acceleration caused by a vibration which is applied to the damping device; means for sensing a pressure which is indicative of the pressure prevailing in the auxiliary chamber; and means for controlling the impression of a voltage on the electrodes in accordance with the product of the acceleration and the pressure.

A third aspect of the present invention is deemed to comprise a device which features: an elastomeric body, the elastomeric body acting as a spring which operatively interconnects a first body and a second body the first body being subject to vibration; means defining a main chamber and an auxiliary chamber, the main chamber undergoing a change in volume when the elastomeric body is subject to distortion in accordance with the relative displacement between the first body and the second body; orifice means disposed between the main and auxiliary chambers, the orifice means having an orifice passage which fluidly interconnects the main working chamber and the auxiliary chamber, the main and auxiliary chambers and the orifice passage being filled with an electrorheopetic fluid; electrodes, the electrodes being disposed in the orifice passage and operatively connectable with a source of voltage in a manner wherein the electrodes can have a voltage selectively impressed thereon; an acceleration sensor for sensing the acceleration of the first body and producing a first signal indicative thereof; a pressure sensor for sensing the pressure prevailing in the auxiliary chamber and producing a second signal indicative thereof; a control circuit, the control circuit being responsive to the first and second signals, the control circuit being operatively connectable with source of voltage, the control circuit including means for: multiplying the first and second signals to produce a product; and inducing a voltage to be impressed on the electrodes in the event that the product is less than the predetermined value.

A fourth aspect of the present invention is deemed to comprise a vibration damping arrangement which features: a housing; an elastomeric body, the elastomeric body being operatively connected with the housing in a manner to define an enclosed space within the housing; a partition, the partition being disposed in the housing in a manner to define a main chamber in the enclosed space between partition and the elastomeric body; a flexible diaphragm, the diaphragm being disposed in the enclosed space in a manner to define an auxiliary chamber and an air chamber, the auxiliary chamber being defined between the diaphragm and the partition; means defining an orifice passage in the partition, the orifice passage fluidly interconnecting the main and auxiliary chamber, the main and auxiliary chambers being filled with an electrorheopetic fluid; electrodes, the electrodes being disposed in the orifice passage; an acceleration sensor for sensing the vibration which is applied to the housing and producing a first signal indicative thereof; a pressure sensor for sensing the pressure prevailing in one of the auxiliary chamber and the air chamber and producing a second signal indicative thereof; a control circuit, the control circuit being responsive to the first and second signals and including a source of voltage, the control circuit including means for: multiplying the first and second signal and producing a product; comparing the product with a predetermined value; and inducing a voltage to be impressed on the electrodes in the event that the product exhibits a predetermined relationship with the predetermined value.

DETAILED DESCRIPTION OF THE PREFERRED EMBODIMENTS

Figure 1:
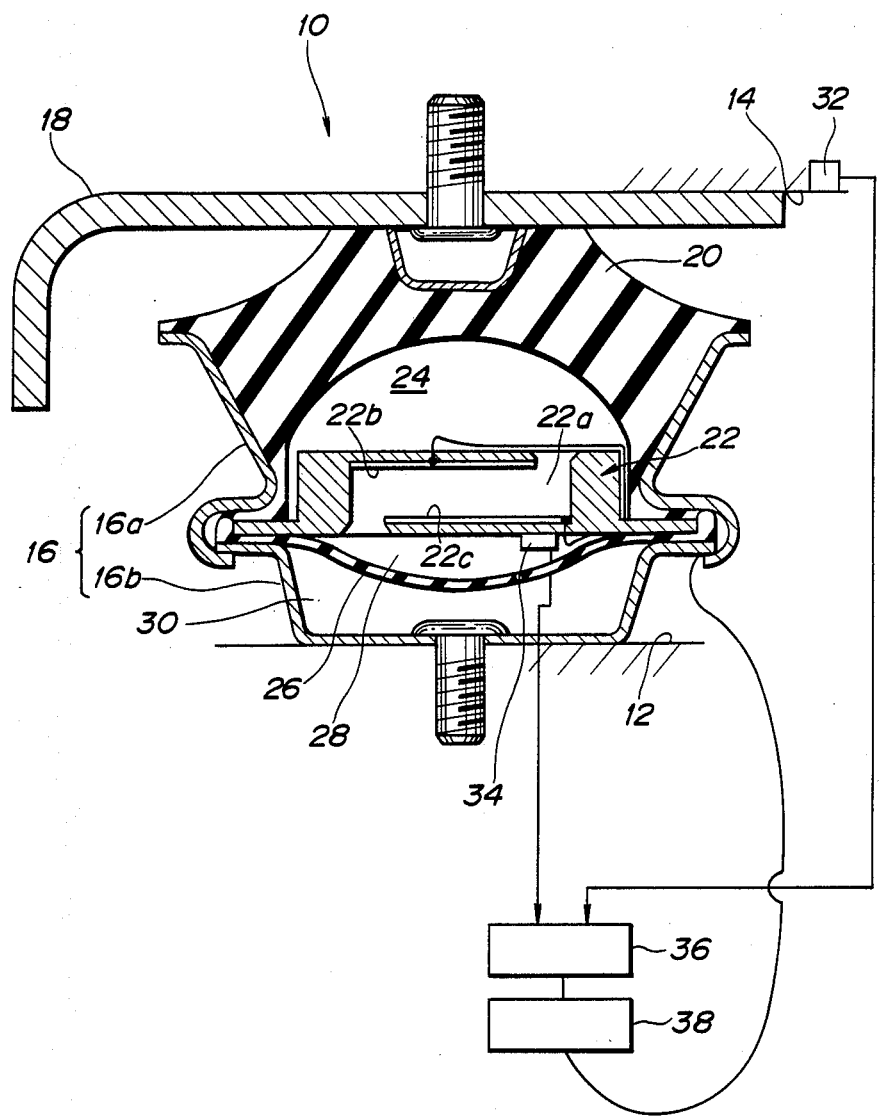
FIG. 1 is a sectional front elevation showing the constructional arrangement of an embodiment of the present invention.

FIG. 1 shows in elevational cross-section, an damping device 10 according to an embodiment of the present invention. In this instance the device is operatively disposed between a structure 12 (e.g. chassis) which is subject to vibration and a structure 14 (e.g. engine) which is supported on the vibrating one.

A brackets 16 and 18 are connected to the structures 12 and 14 respectively. An elastomeric body 20 which acts as a spring is arranged to operatively interconnect the brackets 16 and 18. In this instance the upper portion of the elastomeric body 20 (as seen in the drawings) is fixedly connected (e.g. vulcanized) to the lower surface of the bracket 18 while the lower portion is vulcanized to a tapered portion of a first half 16a of the bracket 16. The second half 16b of the bracket 16 is detachably connected to the structure 12 by way of a bolt (no numeral).

An orifice plate 22 and a flexible elastomeric diaphragm 26 are sandwiched between the first and second halves 16a, 16b of the bracket 16 as shown, in a manner to define a main working chamber 24 (between the orifice plate 22 and the elastomeric body 20) and an auxiliary expansion chamber 28 (between the orifice plate 22 and the diaphragm 26). These chambers are filled with an electrorheopectic fluid or ERF as it will be referred to hereinafter. As is well known, this type of fluid undergoes a sharp increase in viscosity when exposed to an electric field such as generated between two adjacent electrodes when a suitable voltage is impressed thereacross.

An air chamber 30 is defined in the second half 16b of the bracket 16 by the diaphragm.

An accelerometer 32 is mounted on the structure 14 and arranged to sense the vibration to which the structure 14 is subject.

A pressure sensor or transducer 34 is mounted on the lower face of the orifice plate 22 and arranged to sense the pressure changes which occur in the auxiliary chamber 28.

The orifice plate 22 is made of an electrically insulating material and formed with a orifice passage 22a which leads from the main working chamber 24 to the auxiliary one 28. First and second electrically conductive plates 22b and 22c are disposed in the orifice passage 22a so as to juxtaposed one another. These plates are connected by way of lead lines to a power supply circuit 38 and arranged to act as electrodes across which a voltage can be impressed.

The outputs of the accelerometer 32 and the pressure transducer 34 are fed to the control circuit 36. The control circuit is arranged to selectively induce the power supply circuit to impress a voltage of a predetermined value on the electrodes 22b and 22c in an ON/OFF manner.

The above described arrangement is such that when the vibration of the structure 14 is such as to deform the elastomeric body 20, the ERF is displaced back and forth between the main working chamber 24 and the auxiliary chamber 28 through the orifice passage 22a.

While a voltage is not impressed across the plates 22b and 22c, the elastomeric body acts as a spring and the slug of ERF in the passage 22a (which exhibits a low viscosity due in the absence of an electric field) acts as a movable mass.

Figure 2:
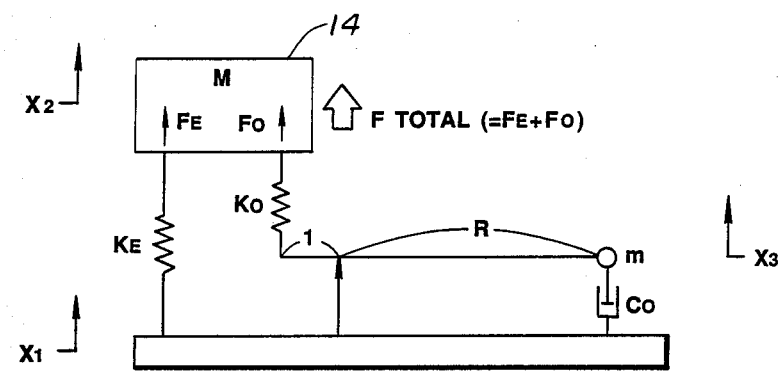
FIGS. 2-8 are models showing the various operating conditions of the first embodiment of the present invention.

The above described arrangement can be visualized as a model of the nature shown in FIG. 2. In this figure X1 and X2 denote the displacement of the vibrating structures 12 and 14 respectively; X3 denotes the displacement of the mass m of the slug of ERF contained in the orifice passage 22a; M denotes the mass of the structure supported by the elastomeric body 20; KE and Ko the support and expansion springs of the system; and R denotes the ratio of the cross sectional area of the orifice passage 22a to the cross sectional area of the main working chamber 24.

As will be appreciated, the mass m and the expansion spring constant Ko define a system which exhibits a resonance frequency and which can be used to attenuate vibrational energy which tends to be transmitted from structure 12 to structure 14 via the mounting device 10.

Accordingly, by selecting the elastomeric member (viz., selecting the spring constants KE and Ko, and the shape of the orifice passage (viz., the cross-sectional area and length of the passage) it is possible to select resonance frequency at which resonance occurs thus tune the device in accordance with given vibration damping requirements. Further, by the selective impression of a voltage across the electrodes 22b and 22c it is possible to achieve control which reduces the amount of vibrational energy which is transmitted through the device.

FIG. 2 shows a model depicting the system defined by the instant embodiment of the present invention. In this arrangement X1, X2 and X3 denote the vibration induced displacements of the structure 12, the structure 14 and the slug of fluid in the orifice.

As will be appreciated from this model, when, because the mass m of the slug of fluid in the orifice is movable, the damping ratio Co in the vibration frequency zone in which the resonance in the orifice takes place, is low, and the vibrational force which is transmitted from the structure 14 to structure 12, consists of the force FE which is transmitted through the supporting spring KE and the force FO which is transmitted by way of the expansion spring FO. While the phase of the two forces FE and FO are different relative to one another, the total force FTOTAL is reduced.

However, if the damping ratio Co is maintained at the same value, when the applied vibration falls in a range on either side of the one in which the fluid slug is induced to resonate, the vibration transmission characteristics deteriorate.

In order to reduce the vibration transmission ratio, it is necessary to reduce the value of FTOTAL.

Figure 3:
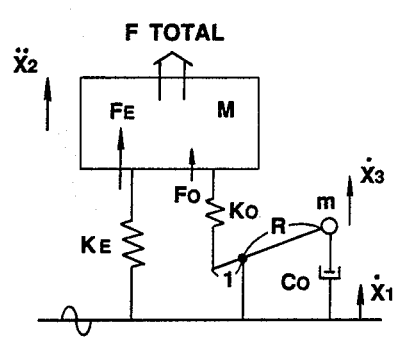

As shown in FIG. 3, FTOTAL assumes a positive trend (viz., $|Fe| > |Fo|$) and in the instance $(\ddot{X}3 - \ddot{X}1)$ is positive, Fe unfailingly becomes positive. On the other hand, when the expansion spring Ko is subject to elongation, either positive or negative values of Fo are acceptable.

Therefore, when Fo is positive and Co is low, X3 becomes large. The value of Fo is reduced and, even if Fo becomes negative, Co remains low and X3 is large. Accordingly, even if the value of Fo increases in the negative direction, FTOTAL is still reduced.

That is to say, under the conditions that FTOTAL>0, $(X3-X1)>0$ it is necessary that Co be low.

Figure 4:
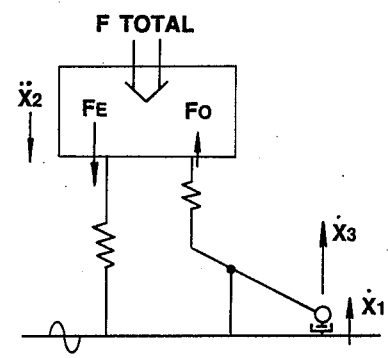

As shown in FIG. 4 FTOTAL is negative, and in the case $(X3-X1)$ is positive, Fe is normally negative. At this time if Fo is positive, Co is low and Fo tends to minimize in the direction of the X3 displacement with the result that FTOTAL tends to increase undesirably. Further, in the case Fo is negative and Co is low, the value of Fo tends to amplify in the displacement direction of X3.

Therefore, when FTOTAL is negative and $(\ddot{X}3-\ddot{X}1)$ is positive, a high Co value is desirable. That is to say, FTOTAL<0 and $(\ddot{X}3-\ddot{X}1)>0$, it is necessary to increase the value of Co.

Figure 5:
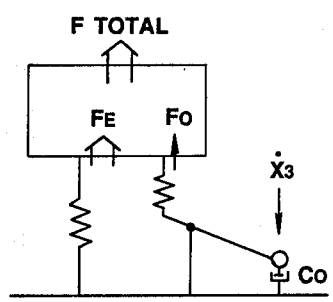
Figure 6:
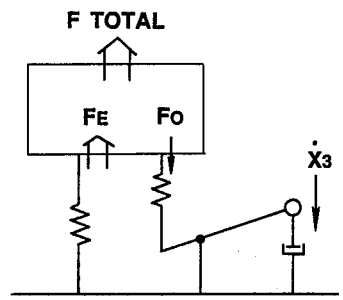

In the same manner, when FTOTAL>0 and $(\ddot{X}3-\ddot{X}1)<0$, the situations shown in FIGS. 5 and 6 occur. In the situation shown in FIG. 5 Fo is positive, Co exhibits a high value and the displacement of X3 tends to be reduced and it is desired to prevent Fo from being increased.

In the situation depicted in FIG. 6 Fo is negative (viz., $|Fe| > |Fo|$), Co becomes low and Fo can readily become positive. As a result, Co assumes a value which provides a provide a high damping effect, and the displacement X3 is low.

Viz., under the conditions FTOTAL>0 and $(\ddot{X}3-\ddot{X}1)<0$, the damping ratio Co becomes high.

Figure 7:
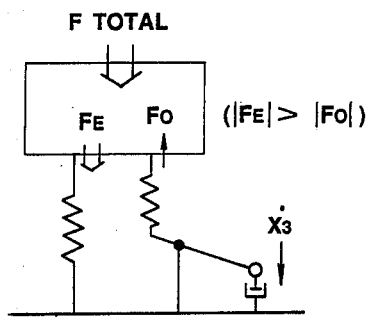
Figure 8:
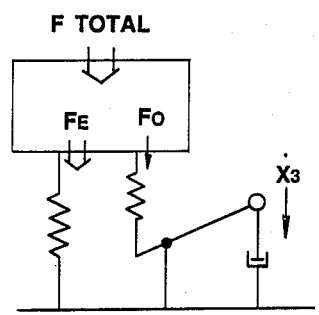

Further, under the conditions FTOTAL>0, $(\ddot{X}3-\ddot{X}1)<0$ the situations shown in FIGS. 7 and 8 occur. In the situation depicted in FIG. 7 in the case Fo is positive (viz., $|Fe| > |Fo|$) Co assumes a low value and Fo tends to amplify. Fo and Fe tend to cancel one another and FTOTAL is reduced.

In the situation depicted in FIG. 8, in the case Fo is negative, Co assumes a low level the displacement X3 increases, Fo becomes smaller and FTOTAL is reduced.

That is to say, under the conditions FTOTAL<0 and $(\ddot{X}3-\ddot{X}1)<0$, Co assumes a low value.

The above FTOTAL and $(\ddot{X}3-\ddot{X}1)$ situations can be visualized in the form of a table of the nature shown below.

TABLE 1

| FTOTAL | (Ẍ3 − Ẍ1) | Co |
|---|---|---|
| pos | pos | low |

TABLE 1-continued

| FTOTAL | (Ẍ3 − Ẍ1) | Co |
|---|---|---|
| pos | neg | high |
| neg | pos | high |
| neg | neg | low |

However, in this case it is possible to apply a voltage to the orifice electrodes 22a and 22b in a manner which changes the viscosity of the ERG in the orifice passage 22a and thus enables the value of Co to be controlled. Viz., if the electrodes have a voltage impressed thereacross, the value of Co is increased while in the event that the voltage is not applied the value of Co assumes a low level.

In accordance with the above, it is possible to obtain optimal control wherein the amount of throttling between the main and auxiliary chambers is switched in a manner wherein in order to increase the value of R and so that $\ddot{X}1 < \ddot{X}3$. This renders it possible for X3 to be selectively changed in the factor $(\ddot{X}3-\ddot{X}1)$.

Further, depending on the direction in which the fluid body in the orifice passage is moving, viz., the polarity of X3, the pressure Pa in the auxiliary chamber 28 switches between positive to negative.

Accordingly, by using a control factor of $(\ddot{X}2 \times Pa)$ wherein $\ddot{X}2$ is the acceleration of the structure 14 it is possible to render the value of Co high and low when the value of the above factor is positive and negative respectively.

Accordingly, the instant embodiment is such that the product of the acceleration and pressure respectively indicated by the accelerometer 32 and the pressure sensor 34, is used in the manner indicated by table 2.

TABLE 2

| (Ẍ2 × PA) | Co | VOLTAGE |
|---|---|---|
| ≧0 | LOW | OFF |
| <0 | HIGH | ON |

Figure 9:
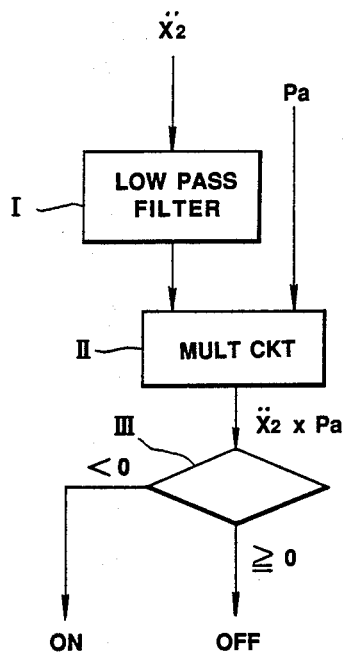
FIG. 9 is a flow chart-like diagram showing the manner in which the electrodes of the first embodiment of the present invention are controlled.

FIG. 9 shows in flow chart-like form an algorithm used in connection with the control of the instant embodiment. As will be seen the output of the accelerometer 32 is passed through a low pass filter and then fed to a multiplier circuit which is also supplied with the output of the pressure sensor. The product of the two inputs is then compared with the value zero. In the event that the product is less than zero a voltage is impressed on the electrodes 22b and 22c.

Figure 10:
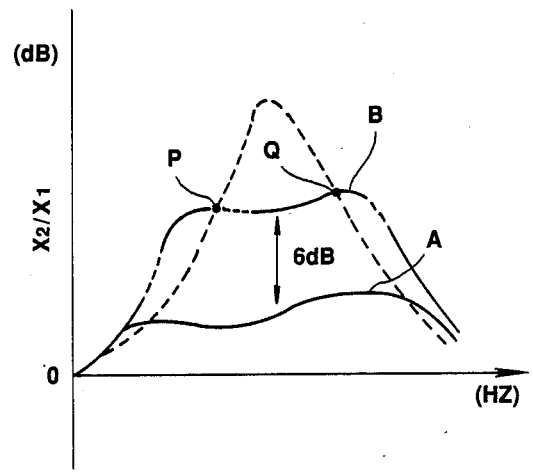
FIG. 10 is a chart showing the effect provided with the present invention.

FIG. 10 compares the effect provided by the present invention with the above disclosed prior art.

In this figure the solid line A denotes the vibration transmission ratio reduction effect provided by the present invention. On the other hand, the phantom line trace B denotes the characteristics provided by the prior art while trace C shows the characteristics produced by arrangement wherein the damping ratio Co is maintained at a high level. As will be appreciated trace A, the damping effect provided by the embodiment of the present invention is such that the amount of vibration which is transmitted is reduced markedly below that provided by the prior art (approximately 6 dB) and does not pass through points P and Q.

Figure 11:
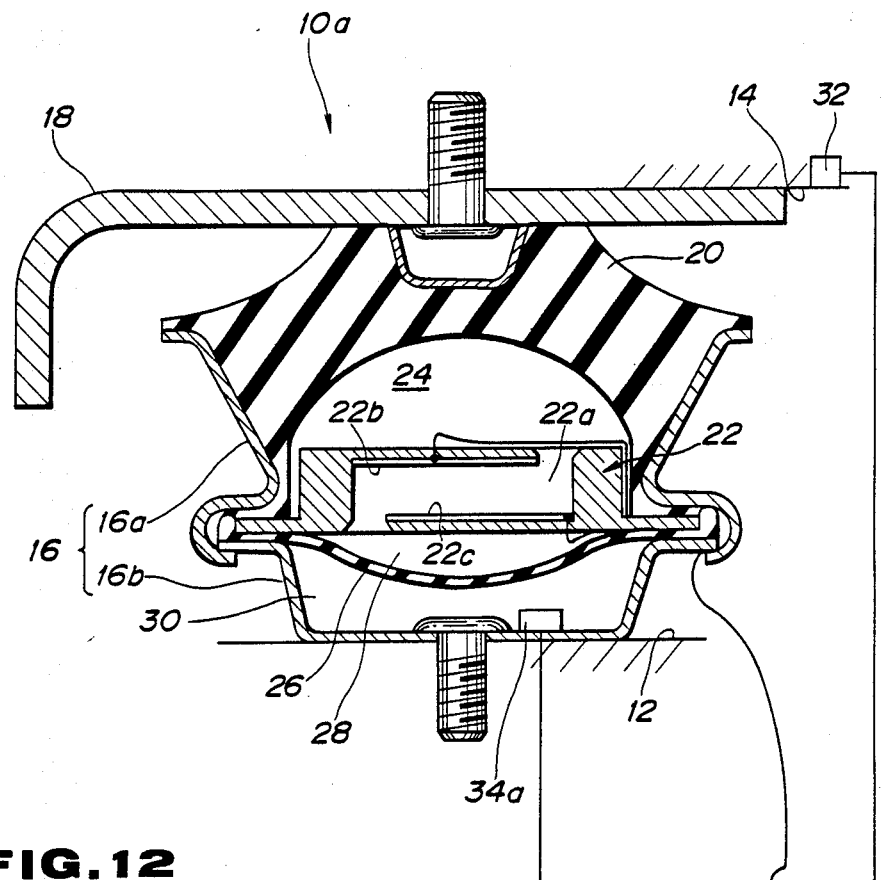
FIG. 11 is a sectional front elevation showing the constructional arrangement of a second embodiment of the present invention.
Figure 12:
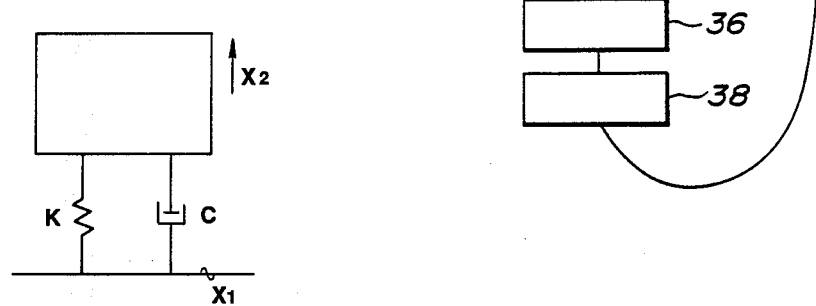
FIG. 12 is a model showing the prior art arrangement discussed in the opening paragraphs of the instant disclosure.

However, the present invention is not limited to placing the pressure sensor in the auxiliary chamber and as shown in FIG. 11 is it possible to locate a pressure sensor 34a in the air chamber 30. As the pressure in the air chamber varies with the pressure which develops in the auxiliary chamber the same effect produced by the first embodiment is also obtained with this embodiment.

What is claimed is:

1. A method of operating a vibration damping device having a housing in which main and auxiliary chambers are defined, and an orifice passage which interconnects the main and auxiliary chambers and in which electrodes are disposed, comprising the steps of:
    sensing the acceleration caused by a vibration which is applied to said damping device;
    sensing a pressure which is indicative of the pressure prevailing in said auxiliary chamber; and
    controlling the impression of a voltage on said electrodes in accordance with the product of said acceleration and said pressure.

2. A vibration damping device comprising:
    a housing in which main and auxiliary chambers are defined;
    an orifice passage which interconnects the main and auxiliary chambers and in which electrodes are disposed;
    means for sensing the acceleration caused by a vibration which is applied to said damping device;
    means for sensing a pressure which is indicative of the pressure prevailing in said auxiliary chamber; and
    means for controlling the impression of a voltage on said electrodes in accordance with the product of said acceleration and said pressure.

3. In a device, the arrangement comprising:
    an elastomeric body, said elastomeric body acting as a spring which operatively interconnects a first body and a second body said first body being subject to vibration;
    means defining a main chamber and an auxiliary chamber, said main chamber undergoing a change in volume when said elastomeric body is subject to distortion in accordance with the relative displacement between said first body and said second body;
    orifice means disposed between said main and auxiliary chambers, said orifice means having an orifice passage which fluidly interconnects said main working chamber and said auxiliary chamber, said main and auxiliary chambers and said orifice passage being filled with an electrorheopetic fluid;
    electrodes, said electrodes being disposed in said orifice passage and operatively connectable with a source of voltage in a manner wherein said electrodes can have a voltage selectively impressed thereon;
    an acceleration sensor for sensing the acceleration of said first body and producing a first signal indicative thereof;
    a pressure sensor for sensing the pressure prevailing in said auxiliary chamber and producing a second signal indicative thereof;
    a control circuit, said control circuit being responsive to said first and second signals, said control circuit being operatively connectable with source of voltage, said control circuit including means for:
    multiplying the first and second signals to produce a product; and
    inducing a voltage to be impressed on said electrodes in the event that said product is less than said predetermined value.

4. A vibration damping arrangement comprising:
    a housing;
    an elastomeric body, said elastomeric body being operatively connected with said housing in a manner to define an enclosed space within said housing;
    a partition, said partition being disposed in said housing in a manner to define a main chamber in said enclosed space between partition and said elastomeric body;
    a flexible diaphragm, said diaphragm being disposed in said enclosed space in a manner to define an auxiliary chamber and an air chamber, said auxiliary chamber being defined between said diaphragm and said partition;
    means defining an orifice passage in said partition, said orifice passage fluidly interconnecting said main and auxiliary chamber, said main and auxiliary chambers being filled with an electrorheopetic fluid;
    electrodes, said electrodes being disposed in said orifice passage;
    an acceleration sensor for sensing the vibration which is applied to said housing and producing a first signal indicative thereof;
    a pressure sensor for sensing the pressure prevailing in one of said auxiliary chamber and said air chamber and producing a second signal indicative thereof;
    a control circuit, said control circuit being responsive to said first and second signals and including a source of voltage, said control circuit including means for:
    multiplying said first and second signal and producing a product;
    comparing said product with a predetermined value; and
    inducing a voltage to be impressed on said electrodes in the event that said product exhibits a predetermined relationship with said predetermined value.

* * * * *